United States Patent

[11] 3,549,853

| [72] | Inventor | Jurgen Guido<br>Borsigstrasse 4, Neutraubling uber<br>Regensburg, Germany |
|---|---|---|
| [21] | Appl. No. | 763,797 |
| [22] | Filed | Sept. 30, 1968 |
| [45] | Patented | Dec. 22, 1970 |
| [32] | Priority | Mar. 29, 1966 |
| [33] | | Germany |
| [31] | | No. G46437 |
| | | Continuation-in-part of application Ser. No. 618,206, Feb. 23, 1967, now abandoned. |

[54] METHOD OF PROJECTION WELDING OF PUSH ROD
8 Claims, 1 Drawing Fig.

[52] U.S. Cl. .................................... 219/104, 29/156.7
[51] Int. Cl. .................................... B23k 11/14
[50] Field of Search .................................... 219/101, 104, 105, 113; 29/156.7B

[56] References Cited
UNITED STATES PATENTS
1,468,927 9/1923 Spire .......................... 29/156.7

| 1,491,073 | 4/1924 | Wells............................. | 219/107 |
| 2,265,561 | 12/1941 | Hoern ........................ | 29/156.7 |
| 2,287,540 | 6/1942 | Vang............................. | 219/113 |
| 2,960,080 | 11/1960 | Burnard et al. ............... | 219/107X |
| 3,066,658 | 12/1962 | Gondek....................... | 219/107X |

Primary Examiner—J. V. Truhe
Assistant Examiner—L. A. Schutzman
Attorney—Craig, Antonelli, Stewart & Hill ABSTRACT: A pushrod for an internal combustion engine consisting of a tubular stem having a semispherical headed cap with a tubular extension at most equal in length to the diameter, which cap is cold formed from low-carbon steel having a wall thickness approximately equal to the tubular stem. The cap is projection welded with its circularly shaped flat rim surface to the associated flat end surface of the tubular stem using at most only 10 percent of the current cycles per second. The cap is clamped by two jaws divided in an axial plane of the tubular shaft with a small spacing therebetween and with a spacing of at most 10 percent of the outer diameter of the welding point with respect to the electrode clamp for the tubular stem.

DIMENSION OF "A" = 0.5 mm
MAXIMALLY AFTER TERMINATION
OF WELDING STEP

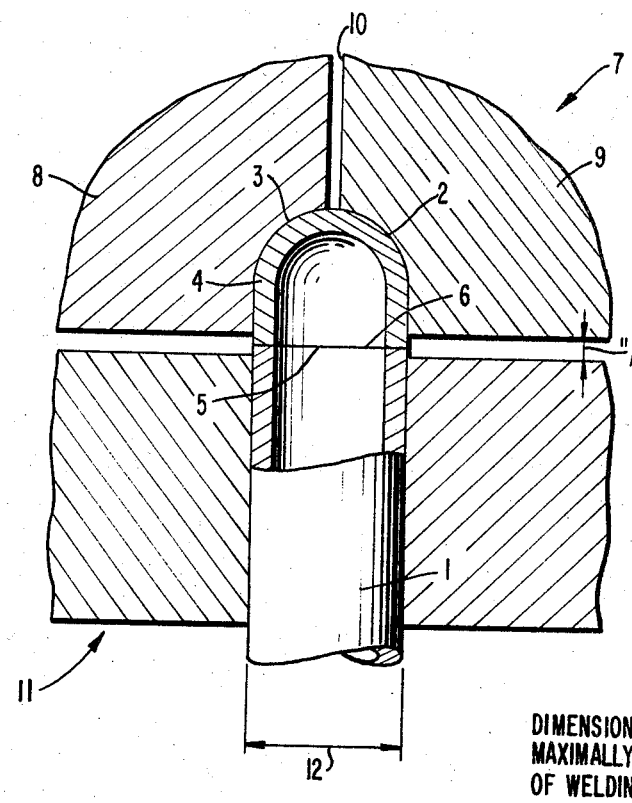
DIMENSION OF "A" = 0.5 mm MAXIMALLY AFTER TERMINATION OF WELDING STEP

METHOD OF PROJECTION WELDING OF PUSH ROD

The application is a continuation in part of Serial No. 618,206, filed on Feb. 23, 1967, now abandoned.

The present invention relates to a pushrod for internal combustion engines consisting of a tubular stem which carries at least at one end an approximately semicircularly shape cap projecting in the manner of a ball head which is secured with its circularly shaped rim to the end face of the tubular stem by way of a fusion joint.

Pushrods are know already for some time whose tubular stems carry balls simply welded on as ball-shaped caps which are soldered or welded to the end faces of the tubular stem by way of corresponding spherical seating surfaces. However, it is disadvantageous with such prior art constructions that owing to the balls the entire weight of the pushrods is considerably increased which, with the rapid oscillatorylike operating movements of the pushrod, may lead readily to a self-sustain oscillation of the rod if a predetermined operating frequency of oscillations is exceeded. Consequently, such pushrods as are provided with balls are not suitable for decidedly high-speed, valve-controlled internal combustion engines.

For purposes of avoiding the aforementioned shortcomings, cupped caps made of relatively thin-walled sheet steel corresponding in its thickness approximately to the wall thickness of the tubular stem have been proposed in U.S. Pat. No. 2,795,218 to J. P. Heiss which in the simplest construction have the shape of a semicircular dish with a short cylindrical extension by means of which the cap is placed over the associated end of the tubular stem. However, disadvantageous with such caps is not only the fact that they still are relatively heavy by reason of the necessary larger shape compared to the tubular stem but also the fact that precisely for the highest loads and stresses the exclusively cylindrically emplaced caps are not connected sufficiently securely with the tubular stem.

The last-mentioned disadvantage could be eliminated according to U.S. Pat. No. 2,434,080 to L. J. Rosa by more strongly deep-drawn or cupped parts outwardly enlarged in their cylindrical portions in the shape of an annular groove, into whose annular groove a portion of the tubular stem material is to be expanded during assembly of the cap. Since the secure connection, however, not only involves an expensive method and the use of a high grade sheet steel adapted to be strongly deep-drawn, but also is connected with a considerable increase of the cap weight, this solution also does not point to a lightweight, ball-shaped cap which is, nevertheless, securely fastened to the tubular stem.

Since the experience was already made during welding of simple balls that the heat developed during welding, especially within the tubular stem, could be conducted away only with difficulties and lead thereat to a considerable annealing of the necessarily hardened ball material, it has also become known already in the U.S. Pat. No. 2,960,080 to Burnard et al. for purposes of avoiding the use of entire balls to weld caps constructed as a portion of a ball-shaped dish along their circularly shaped rim to the end face of a tubular stem. However, since also in this case no suitable internal cooling is possible, an approximate triple wall thickness is provided for the ball dish compared to the wall thickness of tubular stem which requires in particular special measures for an appropriate welding of the thick cap to the thin tubular stem. This known prior art construction proposes in this connection to construct only a relatively small section of the ball-shaped dish as cap which forms at the inner side thereof a circularly shaped edge, along which the inner surface of the ball-shaped dish forms an approximately right angle in the axial cross section with respect to the ball-shaped rim surface of the ball-shaped dish section. For purposes of the welding operation, inwardly and outwardly projecting flangelike tabs are formed in the associated end surface of the tubular stem which extend over the aforementioned circularly shaped edge whereupon the secured connection is finally established in the form of a fusion joint.

Even though it was already possible to create with such a cap arrangement a sufficiently hard and also securely connected cap, the progress achieved thereby over simply welded-on balls is only slight because also such a cap is considerably more heavy than a thin sheet steel cap merely place over the tubular stem. Therebeyond, one has to take into consideration that the only small curvature of the cap is not adequate with short push rods.

Some of these problems have been partially solved by the British Pat. 714,647, whose tubular extension of a cap is butt welded to the tubular stem of the rod with a conventional butt-welding method employing a clamp spaced a substantial distance from the weld point to avoid removing the welding heat too rapidly from the weld. Consequently, the tubular extension of the cap must be longer than the diameter of the cap and stem; thus, it is impossible to employ simple cold forming, for example, deep drawing in the manufacture of the cap. Thus, the British Patent employs expensive machining to form the cap and hardening only after the welding process, because previously hardened portions of the cap end would lose their hardened character during the welding step. On a production basis, the pushrods of the British Patent are expensive and cumbersome to produce due to the machining and hardening subsequent to the weld.

The present invention is concerned with the aim to avoid the aforementioned shortcomings of the known cap arrangements at the tubular stem of a pushrod and to create therewith a pushrod rigidly connected with the caps thereof and still more lightweight compared to the prior art pushrods.

The underlying problems are solved according to the present invention in that the cap which is cold formed from steel having a thickness approximately equal to the tubular wall thickness and corresponding with the ball diameter to the stem diameter, is welded or soldered with its circularly shaped flat rim surface to the coordinated flat end surface of the tubular stem.

With the arrangement of such caps, which are particularly light in their weight, at the tubular stem of the pushrod, it has been surprisingly discovered that also these thin caps can sufficiently maintain the preexisting hardness with the heretofore customary execution of the welding operation.

The relatively slight deformation stresses of the steel sheet makes it possible that the cap according to a preferred construction of the present invention with the use of an easily machinable, inexpensive low carbon steel for the tubular stem is made of a similar, easily machinable low carbon steel and is case-hardened or chrome-plated.

Other features concern further constructive details of the valve rod according to the present invention.

With pushrods having a ball socket, it has been known already for some time in the U.S. Pat. No. 2,411,650 to Burkhardt to weld the ball socket having a short extension to the plane end surface of tubular stem; however, since the ball socket involves a part machined from solid steel material or stock and of a form and shape considerably differing from a deep-drawn cupped sheet metal part, this known pushrod construction did not disclose or suggest the solution of the present invention.

Accordingly, it is an object of the present invention to provide a pushrod which is simple in construction yet avoids by extremely simple means the aforementioned shortcomings and drawbacks encountered with the prior art constructions.

Another object of the present invention resides in a pushrod of the type described above which is light in weight, has high rigidity an may be readily manufactured without great difficulties.

Still another object of the present invention resides in a pushrod in which relatively inexpensive materials may be used for all major parts thereof and in which all sections have substantially the same wall thickness.

A further object of the present invention resides in a pushrod having a semispherically shaped ball end which can be readily welded to the tubular stem portion of the pushrod without requiring complicated, special measures.

The cap of the present invention is economically and simply formed by cold forming, for example, deep drawing, because of its short tubular extension and may be hardened in the simplest and most economical manner as bulk goods by case hardening. The cap is welded to the tubular stem by projection welding using at most about 10 percent of the cycles per second of the supply current. A very brief welding time, for example, a small fraction of a second, and correspondingly high amperages lead to a very small heating of the remainder of the cap so that no loss of hardness of the case hardened cap results. The clamps extend very close to the welding zone for accuracy and to provide the right amount of heat and protects the remainder of the cap from heating and a consequent loss of hardness, because of the cooling effect of the tightly contacting clamping jaws. Accordingly, the stem of the cap does not need to be larger than the outer diameter of the shank of the tubular stem or extension so that it is possible to form the cap by cold forming, for example, deep drawing of sheet metal with case hardening prior to welding.

BRIEF DESCRIPTION OF THE DRAWING

These and further objects, features and advantages of the present invention will become more obvious from the following description when taken in connection with the accompanying drawing which shows, in the single FIG. thereof, for purpose of illustration only, one embodiment according to the present invention and wherein:

The single FIG. is a partial elevational view, partly in longitudinal cross section, of a pushrod in accordance with the present invention showing the adjacent portions of the welding clamps.

DETAILED DESCRIPTION OF THE DRAWING

Referring now to the drawing, the pushrod illustrated therein for internal combustion engines consists of a tubular stem portion 1 made of easily machinable low-carbon steel and of two semispherically shaped caps 2 also consisting of low-carbon, easily machinable steel which, in addition to a semispherically shaped head portion 3 are provided with a deep-drawn tubular extension 4 of the same steel sheet material and are case-hardened. The caps 2 are welded with the annularly shaped rim surfaces 5 of the extensions 4 thereof to the end surfaces 6 of the tubular stem 1. An electric welding method which has become known in particular for buckle-welded joints is preferred in which of the 50 cycles of the utilized alternating currents only five cycles are used for the welding or soldering, properly speaking.

The present invention is not limited to all the details of the described embodiment. Even though the described construction of the caps 2 is preferred as case-hardened steel sheet caps of an easily deformable steel, these caps could also be made chrome-plated or of any other high-grade, nonchrome-plated steel sheet. Naturally, it suffices if the pushrods in question are provided with a cap according to the present invention only at one end thereof whereas they may be carry at the other end, for example, a ball socket of any conventional construction. The caps 2 may also be provided with small bores extending axially to the tubular stem which serve for the lubricant supply, and the extension 4 may have a length differing from that illustrated without affecting the present invention. However, a length of the extension 4 of at least one-eighth the outer diameter and no more than equal to the diameter is preferred. As shown in FIG. 1, the welding apparatus used in the projection welding method of the present invention to weld the cap 2 to the tubular stem 1 comprises a clamping cap electrode 7 and a clamping stem electrode 11. The clamping electrode 7 substantially encompasses the cap 2 except for a small annular area immediately adjacent the welding zone at the contacting surfaces 5, 6, and consists of two clamping jaws 8 and 9 which have adjacent faces along an axial plane perpendicular to the illustration and providing a spacing 10 therebetween. The clamping electrodes 7 and 11 are spaced from each other by a distance A, which is no greater than 10 percent of the outer diameter 12 of the stem and cap at the welding zone.

An alternating current is used in the projection welding process and is supplied at a high amperage for a fraction of a second at most only 10 percent of the cycles produced per second. Particularly advantageous results are obtained when utilizing about five percent of the cycles produced within 1 second of the alternating current during the welding process. For example, with 50-cycle supply current, a maximum of five cycles would be used and preferably only three cycles. The welding process is of such a short duration and the clamping electrodes are so closely spaced to the welding zone for removal of welding heat that the previously case-hardened drawn cap 2 is not adversely affected.

The above preferred embodiment of the present invention has been described in detail with the recognition that variations may be made within the teachings of the present invention.

I claim:

1. A process for the manufacture of a push valve rod for internal combustion engines, comprising the steps of: cold forming a low-carbon steel into a cup-shaped cap having an outwardly convex semispherical head and a tubular extension thereof provided with an annular axially facing rim at the end opposite the head; case hardening the drawn cup-shaped cap; projection welding the annular rim of the case-hardened cap to the annular rim of an equal diameter tubular stem with an alternating current and employing at most only 10 percent of the cycles per second of the alternating current.

2. The process of claim 1, wherein the step of welding employs only five percent of the cycles produced within 1 second of the alternating current.

3. The process according to claim 1, wherein said step of welding includes clamping the cap with an electrode cap and encompassing substantially the entire outer surface of the cup-shaped cap except the annular area closely adjacent to the annular rim welding zone.

4. The process according to claim 3, wherein said step of welding includes holding the tubular stem by an electrode clamp so as to be provided with an annular gap with respect to the electrode cap that is at most 10 percent of the outer diameter of the cap to be welded at the welding zone.

5. The process according to claim 3, wherein the step of welding employs only five percent of the cycles produced within 1 second of the alternating current.

6. The process according to claim 1, wherein the step of clamping includes clamping the cup-shaped cap with an electrode cap subdivided along an axial plane into two halves provided with a small space therebetween along the axial plane in the clamping position.

7. The process according to claim 6, wherein the step of welding employs only five percent of the cycles produced within 1 second of the alternating current.

8. The process according to claim 6, wherein said step of welding includes holding the tubular stem by an electrode clamp so as to be provided with an annular gap with respect to the electrode cap that is at most 10 percent of the outer diameter of the cap to be welded at the welding zone.